United States Patent
Dente (10) Patent No.: US 10,174,527 B2
(45) Date of Patent: Jan. 8, 2019

(54) BACKUP ENERGY SOURCE FOR AUTOMOTIVE SYSTEMS AND RELATED CONTROL METHOD

(71) Applicant: Magna Closures Inc., Newmarket (CA)

(72) Inventor: Davide Dente, Pisa (IT)

(73) Assignee: MAGNA CLOSURES INC., Newmarket (CA)

(*) Notice: Subject to any disclaimer, the term of this patent is extended or adjusted under 35 U.S.C. 154(b) by 192 days.

(21) Appl. No.: 14/652,497

(22) PCT Filed: Dec. 24, 2013

(86) PCT No.: PCT/EP2013/077993
§ 371 (c)(1),
(2) Date: Jun. 16, 2015

(87) PCT Pub. No.: WO2014/102283
PCT Pub. Date: Jul. 3, 2014

(65) Prior Publication Data
US 2015/0329009 A1    Nov. 19, 2015

Related U.S. Application Data

(60) Provisional application No. 61/748,262, filed on Jan. 2, 2013, provisional application No. 61/748,286, filed
(Continued)

(30) Foreign Application Priority Data

Dec. 24, 2012 (IT) .............................. TO2012A1143
Dec. 24, 2012 (IT) .............................. TO2012A1144
Dec. 24, 2012 (IT) .............................. TO2012A1145

(51) Int. Cl.
*B60L 11/18* (2006.01)
*E05B 77/12* (2014.01)
(Continued)

(52) U.S. Cl.
CPC .......... *E05B 77/12* (2013.01); *B60L 11/1861* (2013.01); *B60L 11/1864* (2013.01);
(Continued)

(58) Field of Classification Search
CPC .......... E05B 77/12; E05B 81/14; E05B 81/86; B60L 11/1872
See application file for complete search history.

(56) References Cited

U.S. PATENT DOCUMENTS 5,497,641 A      3/1996  Linde et al.
5,914,542 A *    6/1999  Weimer .................. H02J 7/345
                                                         307/125
(Continued)

FOREIGN PATENT DOCUMENTS

DE    19527565 A1    1/1997
DE    19916733 A1    10/2000
(Continued)

*Primary Examiner* — Jared Fureman
*Assistant Examiner* — Joel Barnett
(74) *Attorney, Agent, or Firm* — Dickinson Wright PLLC (57) ABSTRACT

A backup energy source (1) for an automotive system (102) in a motor vehicle (101) is designed to receive a main supply voltage ($V_{batt}$), during a normal operating condition, and to provide a backup supply voltage ($V_{sc}$) during a failure operating condition, different from the normal operating condition. The backup energy source (1) has a control unit (2), and a supercapacitor group (4), operable by the control unit (2) to store energy during the normal operating condition and to provide the backup supply voltage ($V_{sc}$) during the failure operating condition. A diagnostic module (10) is coupled to the supercapacitor group (4) to provide the control unit (2) with information concerning an operating status of the supercapacitor group (4).

20 Claims, 6 Drawing Sheets

Related U.S. Application Data on Jan. 2, 2013, provisional application No. 61/748,274, filed on Jan. 2, 2013.

(51) Int. Cl.
*H02J 7/00* (2006.01)
*E05B 81/14* (2014.01)
*E05B 81/86* (2014.01)
*H02J 7/34* (2006.01)

(52) U.S. Cl.
CPC .......... *B60L 11/1872* (2013.01); *E05B 81/14* (2013.01); *E05B 81/86* (2013.01); *H02J 7/0052* (2013.01); *H02J 7/345* (2013.01)

(56) References Cited

U.S. PATENT DOCUMENTS

| | | | |
|---|---|---|---|
| 6,056,076 A | 5/2000 | Bartel et al. | |
| 6,102,454 A | 8/2000 | Weyerstall | |
| 6,914,346 B2 | 7/2005 | Girard | |
| 7,145,436 B2 | 12/2006 | Ichikawa et al. | |
| 7,261,335 B2 | 8/2007 | Schupp | |
| 7,642,669 B2 | 1/2010 | Spurr | |
| 7,791,218 B2 | 9/2010 | Mekky et al. | |
| 7,804,187 B2 | 9/2010 | Pecoul et al. | |
| 7,888,817 B2 | 2/2011 | Herges et al. | |
| 8,376,416 B2 | 2/2013 | Arabia, Jr. et al. | |
| 8,485,586 B2 | 7/2013 | Netherland, III et al. | |
| 8,534,101 B2 | 9/2013 | Mette et al. | |
| 2003/0169022 A1* | 9/2003 | Turner | G06F 1/30 320/166 |
| 2003/0222505 A1 | 12/2003 | Randall | |
| 2008/0246443 A1* | 10/2008 | Doljack | F02N 11/0866 320/167 |
| 2009/0088993 A1* | 4/2009 | Oohasi | B60L 3/0038 702/63 |
| 2009/0102434 A1* | 4/2009 | Nakajima | H02J 7/345 320/166 |
| 2009/0146496 A1* | 6/2009 | Herges | H02J 9/061 307/64 |
| 2010/0231049 A1* | 9/2010 | Hinton | H02J 9/061 307/66 |
| 2012/0169453 A1 | 7/2012 | Bryla et al. | |
| 2012/0268080 A1* | 10/2012 | Jeon | G06F 1/263 320/167 |
| 2014/0088825 A1 | 3/2014 | Lange et al. | |
| 2014/0175813 A1 | 6/2014 | Margheritti et al. | |

FOREIGN PATENT DOCUMENTS

| | | |
|---|---|---|
| DE | 102005059246 A1 | 6/2007 |
| DE | 102009002202 A1 | 10/2010 |
| EP | 0694664 A1 | 1/1996 |
| EP | 0856625 A1 | 8/1998 |
| EP | 2112739 A1 | 10/2009 |
| FR | 2759108 A1 | 8/1998 |
| FR | 2763627 A1 | 11/1998 |
| FR | 2857399 A1 | 1/2005 |
| JP | 2000064685 A | 2/2000 |
| JP | 2001303821 A | 10/2001 |
| JP | 2007030650 A | 2/2007 |
| JP | 2008005662 A | 1/2008 |
| JP | 2008029064 A | 2/2008 |
| JP | 2009144441 A | 7/2009 |
| JP | 2009257008 A | 11/2009 |
| WO | WO 9800319 A1 | 1/1998 |
| WO | WO2005047628 A1 | 5/2005 |
| WO | WO2007003469 A2 | 1/2007 |
| WO | WO2015015258 A2 | 2/2015 |

* cited by examiner

BACKUP ENERGY SOURCE FOR AUTOMOTIVE SYSTEMS AND RELATED CONTROL METHOD

CROSS-REFERENCE TO RELATED APPLICATION

This application is a National Stage of International Application No. PCT/EP2013/077993 filed Dec. 24, 2013 and which claims the benefit and priority of Italian Patent Application Nos. TO2012A001143, TO2012A001144, and TO2012A001145 all filed Dec. 24, 2012 and U.S. Provisional Application No. 61/748,262, U.S. Provisional Application No. 61/748,274, and U.S. Provisional Application No. 61/748,286 all filed Jan. 2, 2013. The entire disclosure of each of the above applications is incorporated herein by reference.

TECHNICAL FIELD

The present invention relates to a backup energy source for automotive systems and to a related control method.

BACKGROUND ART

As it is known, several automotive systems require the presence in a vehicle of a backup energy source, to provide electrical energy in substitution, or as an aid to a main power supply of the vehicle, in case of failure or interruption of the same main power supply.

This backup power source is usually kept in a charged state during normal operation, by the main power supply of the vehicle, so as to be readily available as soon as the need arises, for example in case of an accident or crash of the vehicle.

For example, the use of a backup power source coupled to a vehicle closure device has been proposed, in order to supply electrical energy, in case the main power supply of the vehicle fails, so that opening of the closure device is possible even in emergency situations.

It is underlined that the expression "closure device" is used herein to generally indicate any element movable between an open position and a closed position, respectively opening and closing an access to an inner compartment of a motor vehicle, therefore including, boot, rear hatches, bonnet lid or other closed compartments, window regulators, sunroofs, in addition to the side doors of a motor vehicle, to which the following description will make explicit reference, purely by way of example.

Security and safety regulations indeed require opening and closing, for example of the vehicle doors, even in case of failure of the main power supply of the vehicle, or in case of interruptions or breaking of the electrical connection between the main power supply and the vehicle doors; this kind of situation may occur, for example, in case of an accident or crash involving the vehicle.

However, the integration of a backup power source, and of the related electronic circuitry, in automotive systems, such as in vehicle door systems, has proven to be a difficult task, due to size requirements, as also has proven to be difficult meeting desired electrical performance, for example in terms of energy density or current output, especially in automotive operating conditions, requiring, for example, safe operation at very high temperatures (for example up to 100° C.).

Some solutions have been proposed, envisaging use of capacitor elements as backup energy sources in a vehicle, such as those discussed in WO 2005 047628 A1 and FR 2 857 399 A1; however, these solutions have proven not be satisfactory, in particular since they do not provide a reliable control of the electrical performance of the backup energy source during its operation, for example during its recharge.

Moreover, it is known that backup energy source solutions, designed for use in other technical fields, are generally not able to meet the specific requirements required of the automotive field.

A need is therefore felt in the automotive field for an optimized backup power source, able to reliably supply automotive systems even in case of failure of the main power source.

DISCLOSURE OF INVENTION

It is therefore an object of certain aspects of the present invention to provide a backup power source, designed to meet the aforementioned need.

This object may be achieved by a backup power source, and a related control method, as defined in the appended claims.

BRIEF DESCRIPTION OF THE DRAWINGS

A preferred, non-limiting embodiment of certain aspects of the present invention will be described by way of example with reference to the accompanying drawings, in which.

BEST MODE FOR CARRYING OUT THE INVENTION

Figure 1:
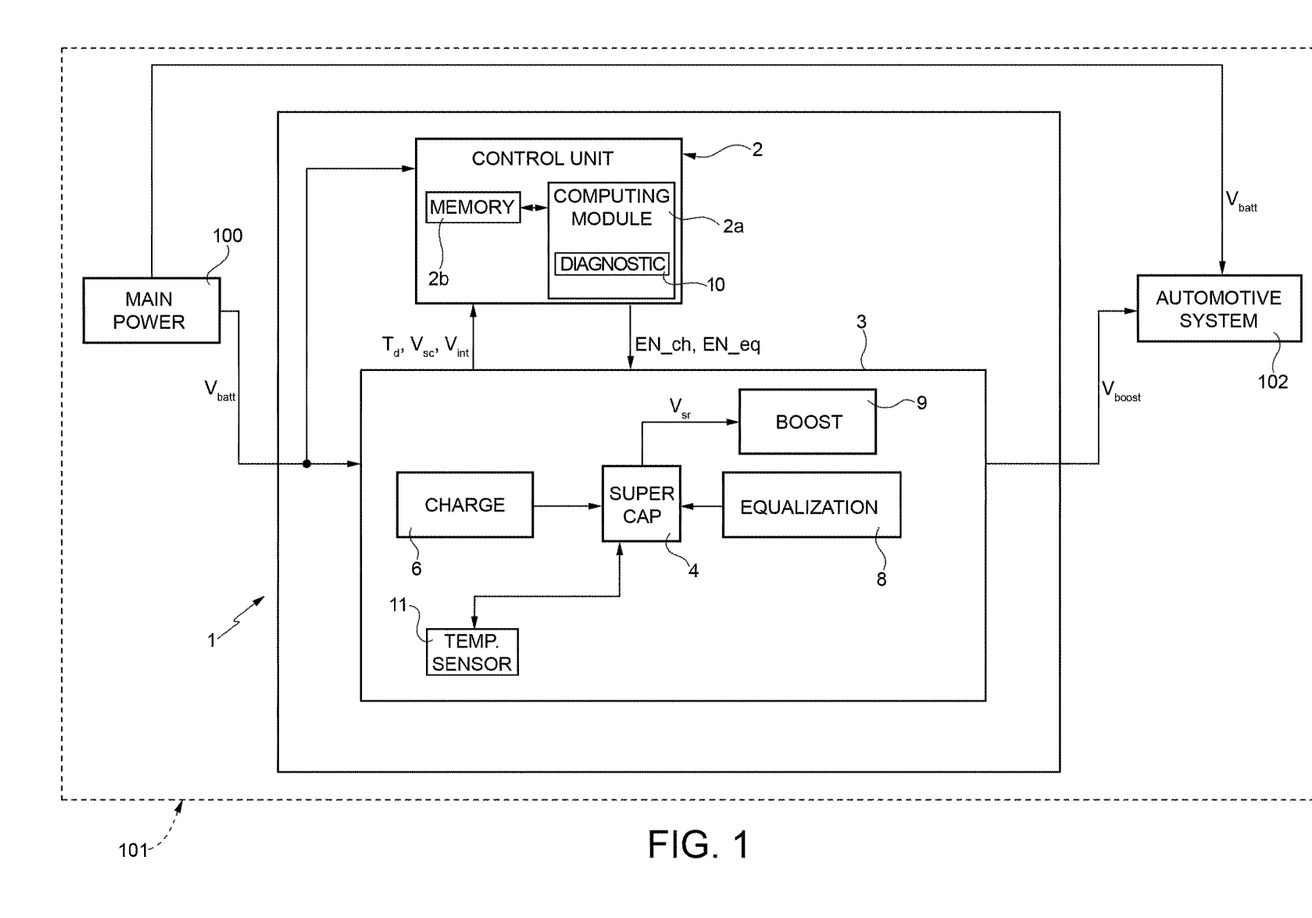
FIG. 1 is a general block diagram showing a backup power source for an automotive system.

Reference 1 in FIG. 1 indicates as a whole an integrated backup energy source, which is coupled to a main power source 100 of a motor vehicle 101 (shown schematically), for example a battery, so as to receive a main voltage $V_{batt}$, for example with a value of 12 V.

The backup energy source 1, in case of failure or interruption of the main power source 100, is configured to supply electrical energy to an automotive system 102 (shown schematically) of the motor vehicle 101, which is instead supplied by the main power source 100 in normal operating conditions. The automotive system 102 may be for example an electronic latch coupled to a door of the motor vehicle 101.

The backup power source 1 includes a control unit 2 and a power unit 3; the control unit 2 is for example provided with a microcontroller, microprocessor or analogous computing module 2a, configured to control operation of the power unit 3, also based on the value of the main voltage $V_{batt}$; for example, if the value of the main voltage $V_{batt}$ decreases below a predetermined threshold value, the control unit 2 may determine that an emergency condition is occurring, when the backup energy source 1 may be needed.

The control unit 2 has an embedded memory 2b, for example a non-volatile random access memory, coupled to the computing module 2a, storing suitable programs and computer instructions (for example in the form of a firmware). It is recognized that the control unit 2 may alternatively comprise a logical circuit of discrete components to carry out the functions of the computing module 2a and memory 2b.

According to an aspect of the present solution, the power unit 3 of the backup energy source 1 includes a group of low voltage supercapacitors 4 (hereinafter supercap group 4), as an energy supply unit (or energy tank) to provide power backup to the automotive system 102, even in case of power failures. Supercapacitors may include electrolytic double layer capacitors, pseudocapacitors or a combination thereof.

Supercapacitors advantageously provide high energy density, high output current capability and have no memory effects; moreover, supercapacitors have small size and are easy to integrate, have extended temperature range, long lifetime and may withstand a very high number of charging cycles. Supercapacitors are not toxic and do not entail explosive or fire risks, thus being suited for hazardous conditions, such as for automotive applications.

Figure 2:
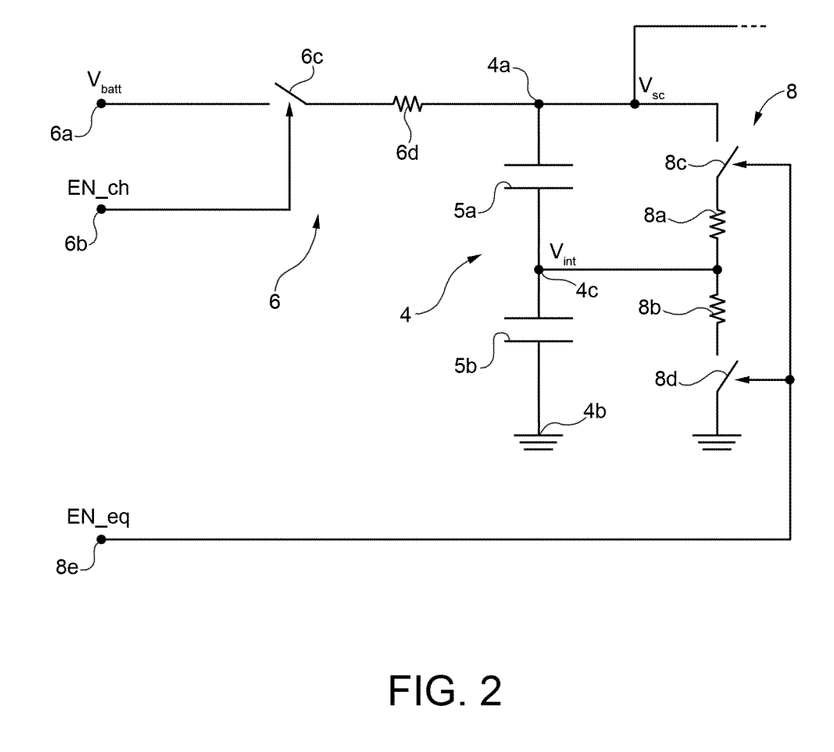
FIG. 2 is a circuit diagram of a charge module of the backup power source of FIG. 1.

In a possible embodiment, as shown in FIG. 2, the supercap group 4 may include two supercapacitor cells 5a, 5b, connected in series between a first node 4a and a second node 4b (for example connected to a reference ground potential) and defining an intermediate node 4c, each providing, when charged, a voltage level for example of 2.5 V-2.7 V, in order to jointly provide on the first node 4a a supercap voltage $V_{sc}$, for example in the order of 3 V-5 V, which may be used as a backup power supply, in emergency situations, when the energy from the main power source 100 of the motor vehicle 101 is not available. Supercapacitor cells 5a, 5b are thus of a low voltage type and also have a high capacity, for example in the order of 16 F-20 F, for example 18 F.

The power unit 3 of backup energy source 1 further includes a charge module 6; an equalization module 8 and a boost module 9.

The charge module 6 is electrically coupled to the supercap group 4 and is configured to recharge, starting from the main voltage $V_{batt}$, whenever power from the main power source 100 is available, the supercap group 4, so that the same supercap group 4 may offer a full energy storage for emergency situations and any leakage currents are compensated.

The equalization module 8 is electrically coupled to the supercap group 4, and is configured to ensure that both supercapacitor cells 5a, 5b have a desired cell voltage value, in particular a same cell voltage value during operation (to achieve a balanced operating condition). The equalization module 8 also avoids that supercapacitor cells 5a, 5b have a cell voltage over a maximum desired cell voltage level, protecting the supercapacitors against overcharging.

The boost module 9, for example including a PWM boost converter (or dc-dc step up converter), of a known type here not discussed in detail, receives at its input the supercap voltage $V_{sc}$ generated by the supercap group 4, and is configured to boost, that is to increase, its value up to automotive standard voltages (for example 9 V-16 V), and to provide enough output current capability to drive a standard automotive system 102, such as an electric motor. Indeed, the supercap voltage $V_{sc}$ may be too low to provide an effective back-up power source to drive the automotive system 102 in emergency situations, like lost or insufficient power supply from main power source 100 of the motor vehicle 101. The boost module 9 thus provides at its output (that is also the output of the backup energy source 1) a boosted voltage $V_{boost}$, as a function of the supercap voltage $V_{sc}$.

The backup energy source 1 further includes a diagnostic module 10, which is operatively coupled to the supercap group 4 and is configured to monitor the health status of the supercapacitors during the charging process and based on the same charging process, by measuring their voltage value, capacitance value, and internal equivalent resistance (DCR—Direct Current Resistance), as will be discussed hereinafter.

A temperature sensor 11 is configured to monitor the operating temperature of the supercap group 4, and it is coupled to the diagnostic module 10 to provide the detected temperature information $T_d$; for example, temperature sensor 11 may include an NTC (Negative Temperature Coefficient) resistor arranged in the proximity of the supercap group 4. The diagnostic module 10 is operatively coupled to the control unit 2, to provide diagnostic information thereto.

In a possible embodiment, as shown in FIG. 1, the diagnostic module 10 may be implemented in the control unit 2 of the backup energy source 1, as a diagnostic routine run by the microprocessor or microcontroller of computing module 2a; the control unit 2 may for this reason receive at input the value of the supercap voltage $V_{sc}$ and/or the voltage value at the intermediate node 4c between the supercapacitor cells 5a, 5b, denoted with $V_{int}$, and temperature $T_d$.

In more details, and as shown in the schematic circuit diagram of FIG. 2, the charge module 6 of the backup energy source 1 has a first input 6a, which is designed to receive the main voltage $V_{batt}$ for charging of the supercap group 4.

The charge module 6 also has a second input 6b, which is designed to receive a charge-enable signal En_ch from the control unit 2, that is a digital signal whose value is indicative of the requirement, determined by the same control unit 2, of enabling or stopping the charge of the supercap group 4.

The charge module 6 includes a power switch 6c and a power resistor 6d.

The power switch 6c, for example a solid state switch like a MOSFET switch, is connected between the first input 6a and the power resistor 6d, and has a control terminal coupled to the second input 6b, thereby receiving the charge-enable signal En_ch.

The power resistor 6d is coupled between the power switch 6c and the first node 4a of the supercap group 4.

When enabled by the charge-enable signal En_ch via the power switch 6c, charging of the supercap group 4 at the main voltage $V_{batt}$ occurs through the power resistor 6d.

In particular, the control unit 2 may generate a PWM (Pulse Width Modulated) charge-enable signal En_ch, during charging of the supercap group 4, thus connecting and disconnecting in rapid succession the supercap group 4 to the main voltage $V_{batt}$.

As previously indicated, charging of the supercap group 4 may be a continuative process, as long as the control unit 2 senses a value of the main voltage $V_{batt}$ higher than a preset threshold, that is indicative of a possible failure affecting the main power source 4.

The equalization module 8, in a possible passive embodiment, includes a first and a second equalizing resistors 8a, 8b, having a same resistance value. The first equalizing resistor 8a is connected between the intermediate node 4c and the first node 4a of the supercap group 4, via the interposition of a first equalizing switch 8c, thus being selectively connectable in parallel to the first supercapacitor cell 5a; the second equalizing resistor 8b is connected between the intermediate node 4c and the second node 4b of the supercap group 4, via the interposition of a second equalizing switch 8d, thus being selectively connectable in parallel to the second supercapacitor cell 5b.

The first and the second equalizing switches 8c, 8d are solid state switches, for example including a respective MOSFET transistor, both controlled by an equalizing enable signal EN_eq received from the control unit 2 at a control input 8e of the equalization module 8.

In particular, the equalizing enable signal EN_eq controls the first and second equalizing switches 8c, 8d so as to enable or disable the equalization process, in order to save energy stored in the supercap group 4, when the same supercap group 4 is not used as a backup power source.

The operation of the diagnostic module 10 of the backup energy source 1 is now discussed in more details.

Possible failure modes, which are monitored by the diagnostic module 10 and may affect any one, or both, of the supercapacitor cells 5a, 5b are the following:
open circuit failure;
short circuit failure;
increase of the leakage current;
increase of the equivalent series resistance;
decrease of the capacitance value.

These failure modes may be detected in real time during operation of the automotive system, using particular logic and algorithms envisaged by the diagnostic routine.

In particular, an "open circuit" failure for any one of the two supercapacitor cells 5a, 5b generates a corresponding failure in the whole series, which may be detected whenever a substantially zero voltage is present on the supercapacitor series, even if charged.

A "short circuit" failure of a supercapacitor cell 5a, 5b of the series generates the doubling of the series capacitance and a corresponding reduction of the value of the supercap voltage $V_{sc}$; the fully charged voltage value may not be reached and/or may not be maintained over time.

An increase of the "leakage current" may be detected when the charged state of the supercapacitor cells 5a, 5b (whose value may be set, as a preset threshold) is not obtained, even after a long charging time, or when the value of the supercap voltage $V_{sc}$ over the series undergoes an unexpected variation (for example a variation not compatible with the charging process that is being applied to the supercap group 4).

The increase of the "equivalent series resistance" of any one of the supercapacitor cells 5a, 5b determines an increase of the resistance of the whole series, while the decrease of the "capacitance" of any one of the supercapacitor cells 5a, 5b determines an increase of the capacitance of the whole series.

Open circuit and short circuit failures determine a complete failure of the backup energy source 1, since the energy storage function of the supercapacitor cells 5a, 5b is invalidated.

On the contrary, the other failures listed above are progressive; in particular, when the measured values (for example capacitance and or resistance values) reach a first alarm threshold, which may suitably be predetermined, the diagnostic module 10 is able to generate a pre-alarm indicating the incoming failure to the user/driver or to service personnel, even when the supercapacitor cells 5a, 5b are still in a working state.

When the failure then reaches a limit value (and the measured values reach a second predetermined alarm threshold), the diagnostic module 10 may signal the complete failure of the backup energy source 1.

According to an aspect of the present solution, the capacitance of the supercapacitor cells 5a, 5b is estimated during their lifecycle by the diagnostic module 10 based on the charging process, measuring the time that it takes for the supercapacitors to charge from a partially charged voltage to a fully charged voltage, when charging is implemented via a series resistor (the power resistor 6d of the charge module 6) directly from the power supply voltage (the main voltage $V_{batt}$).

Figure 3:
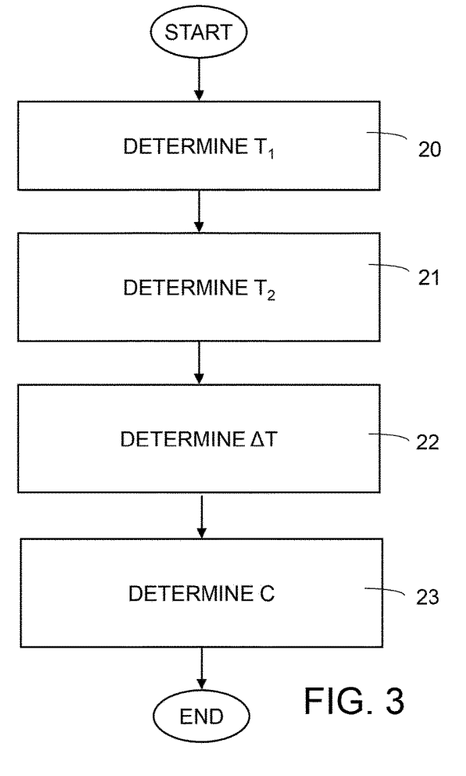
FIGS. 3 and 4 show flowcharts of operations performed by a diagnostic module in the backup power source of FIG. 1.

In particular, and as shown in FIG. 3, the diagnostic module 10 first determines, at step 20, the time $T_1$ to reach a partially charged voltage $V_1$, having a non zero value, starting from a completely discharged state, based on the following expressions:

$$V_1 = V_{batt}\left(1 - e^{\frac{-T_1}{R \cdot C}}\right)$$

$$T_1 = -R \cdot C \cdot \ln\left(1 - \frac{V_1}{V_{batt}}\right)$$

The diagnostic module 10 then determines, at step 21, the time $T_2$ to reach a fully charged voltage $V_2$ based on the following expressions:

$$V_2 = V_{batt}\left(1 - e^{\frac{-T_2}{R \cdot C}}\right)$$

$$T_2 = -R \cdot C \cdot \ln\left(1 - \frac{V_2}{V_{batt}}\right)$$

In the above expressions, C is the supercapacitor capacitance (either of the whole series, if the supercap voltage $V_{sc}$ is considered, or of a first one of the supercapacitor cells 5a, 5b, if the voltage $V_{int}$ at the intermediate node 4c is considered), and R is the resistance of the power resistor 6d.

The charge time $\Delta T$ needed for charging from the partially charged voltage $V_1$ to the fully charged voltage $V_2$ is then determined, at step 22:

$$\Delta T = T_2 - T_1 = R \cdot C \cdot \left(\ln\left(1 - \frac{V_1}{V_{batt}}\right) - \ln\left(1 - \frac{V_2}{V_{batt}}\right)\right)$$

$$\Delta T = R \cdot C \cdot \ln\left(\frac{V_{batt} - V_2}{V_{batt} - V_1}\right)$$

or:

$$\Delta T = C \cdot (R \cdot (\ln(V_{batt} - V_2) - \ln(V_{batt} - V_1)))$$

and the value of the capacitance C is determined, at step 23, as:

$$C = \Delta T / (R \cdot (\ln(V_{batt} - V_2) - \ln(V_{batt} - V_1)))$$

or:

$$C = \frac{\Delta T}{K(V_{batt})}$$

where:

$$K(V_{batt}) = (R \cdot (\ln(V_{batt} - V_2) - \ln(V_{batt} - V_1))$$

In particular, since R, $V_1$ and $V_2$ have preset and known values, complex logarithmic calculations may be avoided during run-time, if the values for K at the possible different main voltages are pre-calculated and stored in a table (which may be included in non volatile memory 2b coupled to the control unit 2).

Concerning the accuracy on the capacitance estimation by the diagnostic module 10, the following considerations may be made, referring to an exemplary case and to exemplary values.

Resistance R may have an absolute accuracy of 5%; in this case, the resistance of the power switch 6c, for example equal to 100 mΩ (that should be summed to the resistance R) is much lower than the 5% value.

Time ΔT may have an absolute accuracy of 2%, due to internal oscillator tolerance over the full temperature range (the oscillator being checked and verified by the control unit 2, in a known manner, here not discussed in detail). If charging of the supercap group 4 is PWM controlled through the power switch 6c, charge time ΔT is corrected, multiplying it by the PWM duty cycle.

Voltage values appear as ratios and not as absolute values, so that the absolute accuracy of the voltage measurements does not influence the accuracy on the capacitance estimation.

An absolute accuracy of 3% may be associated to the measurement of the main voltage $V_{batt}$, also taking into account discretization errors (due to analog to digital conversion at the control unit 2).

The final accuracy in the measurement of the capacitance value is therefore about 10%, summing 5% for resistance measurement, 2% for timing measurement and 3% for any voltage measurement and discretization error.

The value of the main voltage $V_{batt}$, although supposed to be constant, during normal operation is subject to variations, during charging of the supercap group 4.

In order to take into account this aspect, the diagnostic module 10 is configured to measure the variation of the main voltage $V_{batt}$ and to stop or cancel measurement of the capacitance C, if a variance of the main voltage $V_{batt}$ during a given time period is above a determined threshold value.

For low variance values of the main voltage $V_{batt}$, calculation may still be made, using a lowest value of $V_{batt}$ (among those detected in the considered time period), so as to obtain a lower capacitance estimation.

According to another aspect of the present solution, the equivalent series resistance (ESR) of the supercap group 4 is estimated, during operation, by the diagnostic module 10 based on the charging method, in particular to check if it is lower than a required maximum value.

When applying a charging current, the voltage across the supercap group 4 is increased by the product of the charging current by the equivalent series resistance. In particular, when the charging current is zeroed, the value of the supercap voltage $V_{sc}$ will immediately decrease by the voltage drop on the equivalent series resistor.

Using an analog to digital converter with a resolution of n bit, for example 10 bits, and a full scale voltage (FS), for example of 5 V, the resolution dV for the measurement of the supercap voltage $V_{sc}$ is:

$$dV = \frac{FS}{2^n} = \frac{5}{2^{10}} V = 5 \text{ mV}$$

The above AD converter may be implemented within the control unit 2, in particular by the computing module 2a.

The rated value of ESR may be equal or lower than 100 mΩ, so that, in order to obtain a resistance resolution dR of for example 10 mΩ (1/10 of the average value), the minimum charging current $I_{ch}$ is:

$$I_{ch} = \frac{dV}{dR} = \frac{5}{10} = 500 \text{ mA}$$

Figure 4:
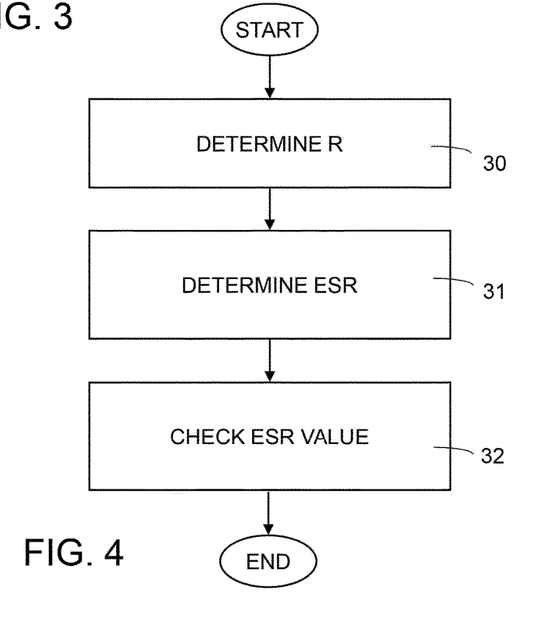

The resistance R of the power resistor 6d is calculated as follow by the diagnostic module 10 at a first step 30, as shown in FIG. 4:

$$R = \frac{V_{batt} - V_{sc}}{I_{ch}} = \frac{12 \text{ V} - 5 \text{ V}}{500 \text{ mA}} = 14\Omega$$

considering a minimum value for ESR detection for the main voltage $V_{batt}$, and a maximum value for the supercap voltage $V_{sc}$.

As previously discussed, the power switch 6c in the charge module 6 may conveniently be controlled via a PWM modulation scheme, so as to reduce power dissipation on the power resistor 6d.

Figure 5:
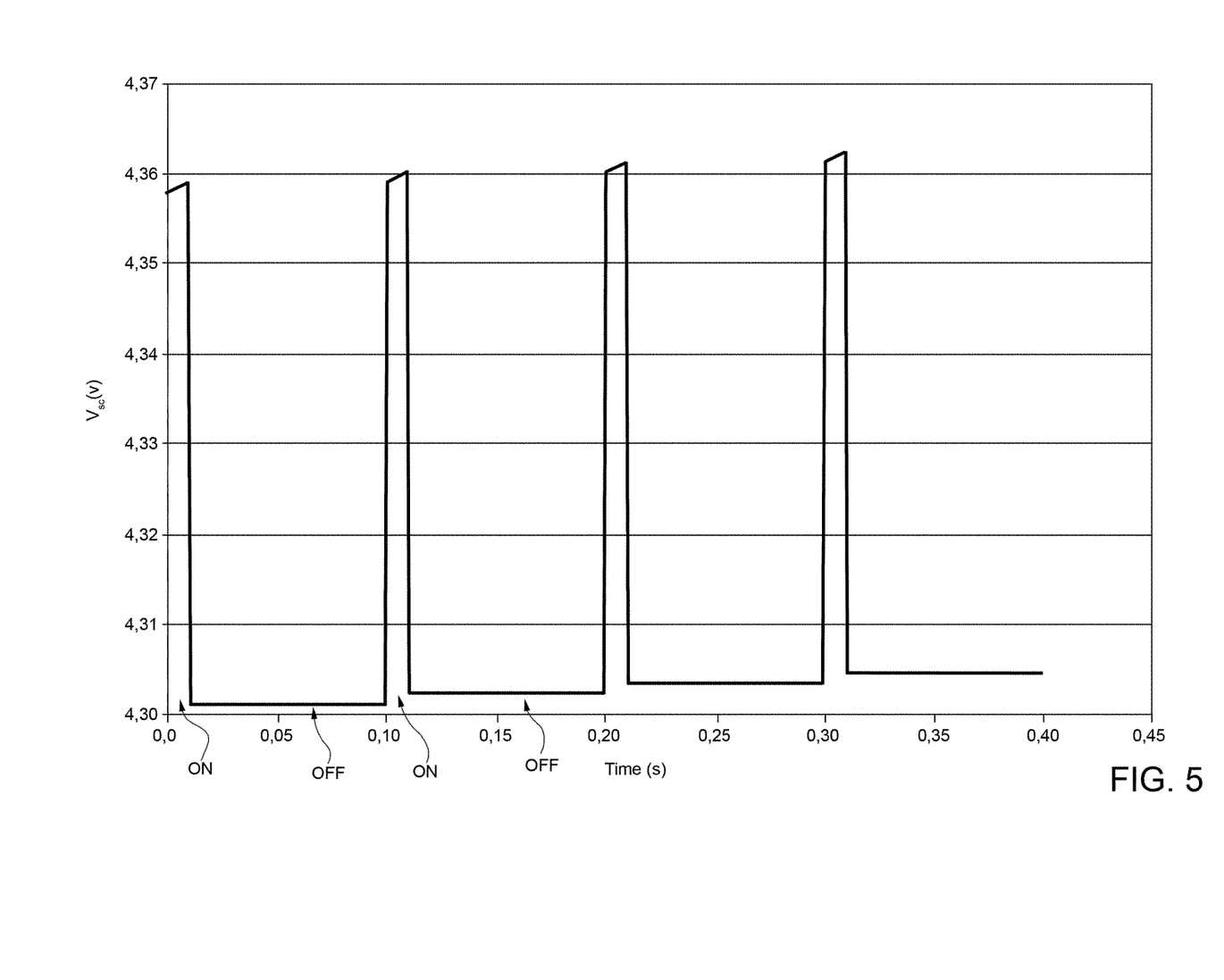
FIG. 5 is a plot of an electric signal in the backup power source of FIG. 1.

In this regard, FIG. 5 shows a possible PWM pattern of the supercap voltage $V_{sc}$, during charging of the supercap group 4, having, at each period, an ON phase followed by an OFF phase, whose respective duration is determined by the duty cycle of the charge-enable signal En_ch.

In this situation, advantageously, the resistance measurement may be carried out, at each period of the charge-enable signal En_ch, in the OFF phase of the duty cycle (that is when the charging current is zeroed due to opening of the power switch 6c). A suitable average of the various measurements may be implemented, in order to get an averaged resulting value.

Based on the above, the ESR may be estimated via the following expression, by the diagnostic module 10 at step 31, as shown in FIG. 4:

$$ESR = R \frac{\Delta V_{sc}}{V_{batt} - V_{sc}}$$

wherein $\Delta V_{sc}$ is the voltage drop across the supercap group 4 due to the charging current $I_{ch}$.

Diagnostic module 10 is then able to check, at step 32, if the determined ESR value is lower than a required value.

Voltages are used as ratios, so that the corresponding accuracy of the AD converter is not relevant for the overall measurement accuracy.

The measurement tolerance on R is about 5% and is instead reflected in the ESR measurement.

If the voltage accuracy is 0.5%, the total estimation error is expected to be lower than 10%.

According to a further aspect of the present solution, the diagnostic module 10 is also configured to take into account the temperature conditions, in which the supercap group 4 operates within the automotive system. These temperature conditions are monitored by the temperature sensor 11.

Indeed, supercapacitor performance is directly influenced by the temperature conditions and by the operating life time.

Figure 6A:
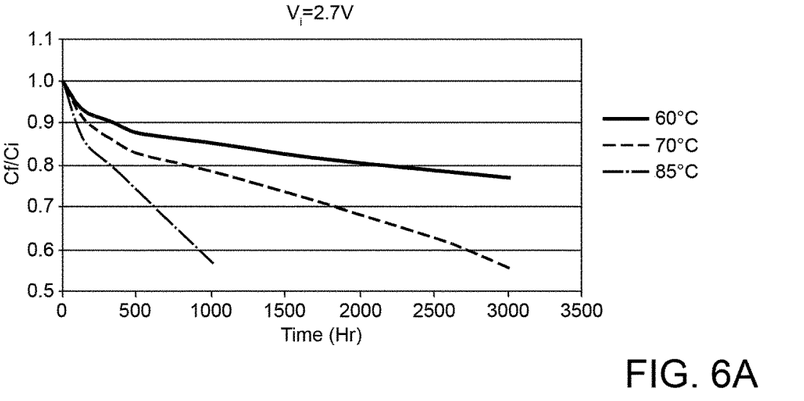
FIGS. 6a-6c show plots of capacitance quantities in the backup power source of FIG. 1, in different operating conditions.
Figure 6B:
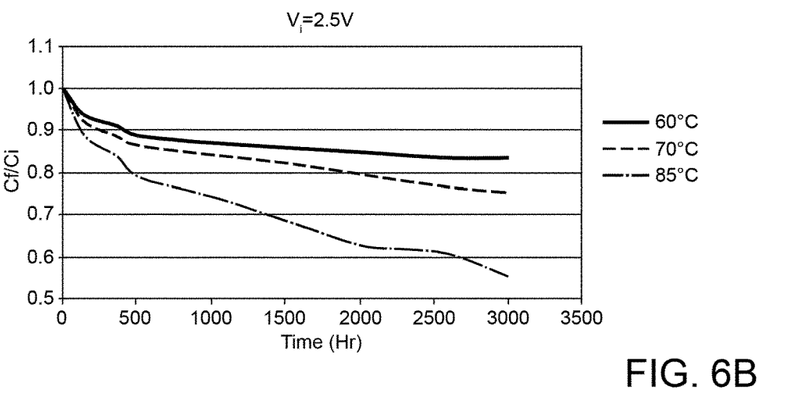
Figure 6C:
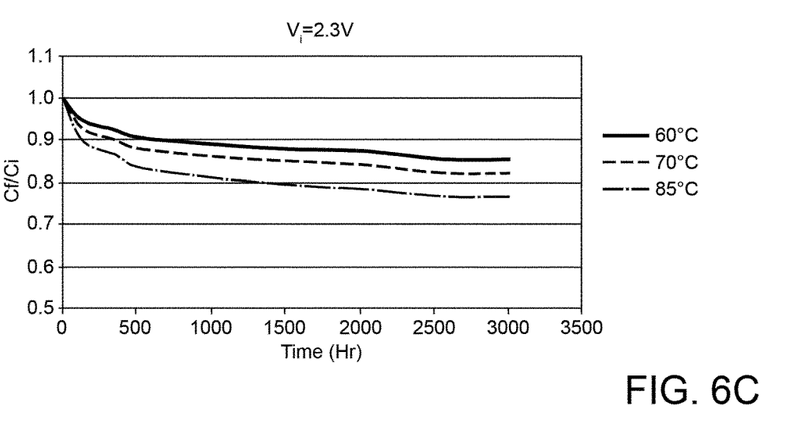

As shown in FIGS. 6a-6c, the capacitance of a supercapacitor is directly correlated to life time, showing a decrease over time (shown is the ratio between a final value $C_f$ and an initial value $C_i$); moreover, the rate of this decrease is influenced by the operating temperature and the initial voltage $V_i$ value across the same supercapacitor.

Automotive systems have to be able to withstand very high temperatures (for example up to 70° C.-100° C.), while assuring a correct operation, or at least avoiding failures.

For example, the supercap group 4 has to assure energy backup to an e-latch assembly of the motor vehicle, to allow the user to exit the vehicle in case of malfunctions (for example battery, fuses or wiring harness malfunctions); at temperatures as high as 70° C.-100° C., the user cannot remain trapped inside the motor vehicle.

In order to allow proper use of the supercap group 4 even at high temperatures, the diagnostic module 10 is therefore configured to implement a suitable decrease strategy for the value of the supercap voltage $V_{sc}$, while the operating temperature increases (this value being controlled by a suitable modification of the charging process through the charge module 6).

Figure 7:
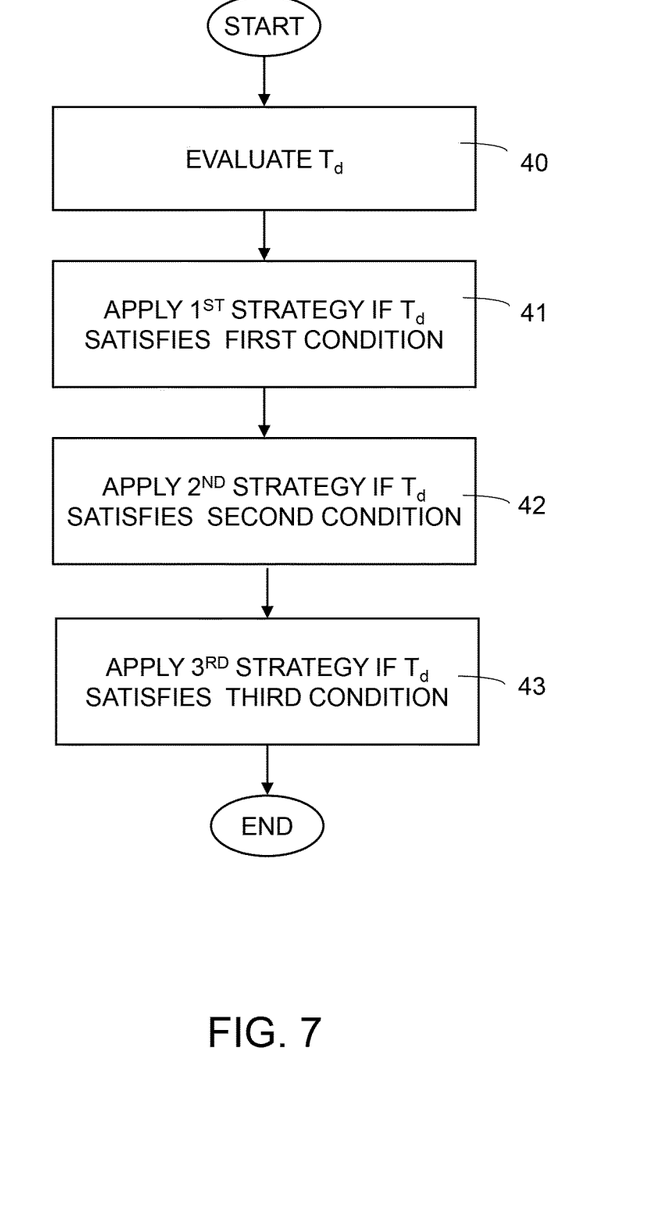
FIG. 7 shows a flowchart of further operations performed by the diagnostic module in the backup power source of FIG. 1.

Accordingly, as shown in FIG. 7, the diagnostic module 10 monitors the value of detected temperature $T_d$, as shown in step 40.

The strategy implemented by the diagnostic module 10 then envisages three different operating conditions, in respective temperature intervals:

for temperatures comprised between $-\text{Temp}_1$ and $+\text{Temp}_1$, step 41, where $\text{Temp}_1$ is a first temperature threshold, whose absolute value is about 38° C.-42° C., for example 40° C., the supercap group 4 is kept fully charged (for example with a voltage level of each supercapacitor cell 5a, 5b in the range of 2.5 V-2.7 V);

for temperatures comprised between $+\text{Temp}_1$ and $+\text{Temp}_2$, step 42, where $\text{Temp}_2$ is a second temperature threshold, whose absolute value is about 85° C.-90° C., for example 85° C., a voltage decrease, for example of the linear type between a first value (for example 2.5 V) and a second value lower than the first (for example 2.1 V), is applied to the supercap voltage $V_{sc}$; and for temperatures higher than $+\text{Temp}_2$, step 43, the supercap group 4 is discharged up to a supercap voltage $V_{sc}$ of a third value, lower than the second value (for example 1 V for each supercapacitor cell 5a, 5b).

According to the above temperature strategy, the decrease of the supercap voltage $V_{sc}$ at higher temperatures allows to reduce the effect of capacitance variations over time, thus improving reliability of the supercap group 4, when used in the backup energy source 1. Moreover, the life time of the same supercap group 4 is extended.

In general, the supercapacitors are available when actually needed and an improved life time may be achieved; in this regard, it has been shown, via simulation, that this control strategy allows to achieve at least fifteen years of reliable life time for the supercap group 4.

The advantages of the discussed solution are clear from the foregoing description.

Indeed, a reliable backup energy source 1 is provided for automotive systems, for example to power an e-latch assembly in case of failure of the main power source of the motor vehicle; a reliable control of the electrical performance of the backup energy source 1 is provided during its operation.

In fact, embodiments according to the present description may allow to timely diagnose any fault of the supercapacitor cells 5a, 5b in the supercap group 4, such as an increase of equivalent series resistance and a decrease of the capacitance value; open circuit or short circuit conditions; an increase of leakage current.

Monitoring of the electrical performance of the supercap group 4 may be advantageously performed in real time during its operation, in particular during its charging process, based on the characteristics of the same charging process.

The discussed temperature control strategy may allow to reliably use supercapacitors as the backup energy source 1 even at very high temperatures, so as to comply with safety requirements of automotive applications.

The backup energy source 1 may be independently controlled by the internal control unit 2, and may also be activated and deactivated without any action from a vehicle main management unit (also known as main ECU or "vehicle body computer"), which is configured to control general operation of the motor vehicle 101, and the related control software.

The use of supercapacitors may allow to provide the backup energy source 1 in a cheap, light and small package; the resultant size and form factor of the energy backup source 1 is such as to allow easy integration within an automotive system 102.

The use of supercapacitors may also allow to achieve high energy density, high capacity and high output current capability, and avoid memory effects and minimize consumption and recharge time. Life time of the supercapacitor group is also very high, thus allowing the use thereof as a reliable backup energy source, without requiring additional backup power sources.

The use of low voltage supercapacitors, for example of the type commonly available in the market, may also allow to reduce the costs of the system and improve its maintainability. Clearly, changes may be made to what described and illustrated herein without, however, departing from the scope defined in the accompanying claims.

For example, the electrical connection of the supercapacitor cells 5a, 5b could be a parallel connection, instead of a series connection, in order to provide the supercapacitor voltage $V_{sc}$, required as a backup supply voltage; also, the number of supercapacitor cells could be different.

The invention claimed is:

1. A backup energy source for an automotive system in a motor vehicle, designed to receive a main supply voltage ($V_{batt}$) from a main power source of the motor vehicle, during a normal operating condition, and configured to provide a backup supply voltage ($V_{sc}$) during a failure operating condition, different from the normal operating condition, the backup energy source comprising:

a control unit;

a supercapacitor group, controlled by the control unit to store energy during the normal operating condition and to provide the backup supply voltage ($V_{sc}$) during the failure operating condition;

a charge module, controllable by the control unit to recharge the supercapacitor group, starting from the main supply voltage ($V_{batt}$), whenever power from the main supply voltage ($V_{batt}$) is available; and a diagnostic module, coupled to the supercapacitor group and designed to provide the control unit with information concerning an operating status of the supercapacitor group, wherein the diagnostic module is configured to detect at least a value of the backup supply voltage ($V_{sc}$), and to monitor, during the recharging process, an equivalent series resistance (ESR) of the supercapacitor group and is configured to estimate a value of capacitance of the supercapacitor group using a plurality of preconfigured values stored in a memory of the control unit, based on said recharging process.

2. The backup energy source according to claim 1, wherein the supercapacitor group includes at least a first and a second supercapacitor cells, connected to each other, to jointly provide the backup supply voltage ($V_{sc}$).

3. The backup energy source according to claim 2, wherein the diagnostic module is configured to determine one or more of the following failure modes of the supercapacitor group: an open circuit failure; a short circuit failure; an increase of the leakage current; an increase of the equivalent series resistance (ESR); a decrease of a value of capacitance (C).

4. The backup energy source according to claim 1, wherein the diagnostic module is configured to estimate the plurality of preconfigured values, by monitoring the time ($\Delta T$) to charge the supercapacitor group from a preset partially discharged value ($V_1$) to a preset fully charged value ($V_2$) for the backup supply voltage ($V_{sc}$).

5. The backup energy source according to claim 4, wherein the charge module is controllable by the control unit to charge the supercapacitor group from the main supply voltage (Vbatt) via a charge resistor element having a resistance R; wherein the plurality of preconfigured values are estimated via the following expression:

$$C = \frac{\Delta T}{K(V_{batt})}$$

wherein K is given by:

$$K(V_{batt}) = (R \cdot (\ln(V_{batt}-V_2) - \ln(V_{batt}-V_1))$$

and is pre-computed for different values of the main supply voltage (Vbatt) and stored in a table in a memory of the control unit.

6. The backup energy source according to claim 1, wherein the diagnostic module is configured to estimate the equivalent series resistance (ESR) of the supercapacitor group to check if it is lower than a preset maximum value; wherein the charge module is controllable by the control unit to charge the supercapacitor group with a charging current ($I_{ch}$), and the diagnostic module is configured to estimate the equivalent series resistance (ESR) by measuring a voltage drop on the supercapacitor group, when charging is interrupted and the charging current ($I_{ch}$) is zeroed.

7. The backup energy source according to claim 6, wherein the charge module is controllable by the control unit to charge the supercapacitor group from the main supply voltage ($V_{batt}$) via a charge resistor element having a resistance R; wherein the diagnostic module is configured to estimate the equivalent series resistance (ESR) of the supercapacitor group via the following expression:

$$ESR = R\frac{\Delta V_{sc}}{V_{batt} - V_{sc}}.$$

8. The backup energy source according to claim 6, wherein the charge module includes a charge resistor element coupled to the supercapacitor group, and a charge switch element, coupled between an input terminal receiving the main supply voltage ($V_{batt}$) and the charge resistor element, and having a control terminal; wherein the control unit is configured to provide a charge-control signal (En_ch) to the control terminal of the charge switch element to control charging of the supercapacitor group, the charge-control signal (En_ch) being a pulse width modulated signal, during the normal operating condition, having a duty cycle defining an ON phase, when the supercapacitor group is charged by the main supply voltage ($V_{batt}$), and an OFF phase where charging of the supercapacitor group is interrupted; and wherein the diagnostic module is configured to estimate the equivalent series resistance (ESR) of the supercapacitor group during the OFF phase of the duty cycle of the charge-control signal (En_ch), when the charging current ($I_{ch}$) is zeroed by the opening of the charge switch element.

9. The backup energy source according to claim 1, wherein the diagnostic module is configured to monitor the operating temperature of the supercapacitor group and to cooperate with the charge module and/or the control unit to implement a charging strategy, as a function of the detected operating temperature.

10. The backup energy source according to claim 9, wherein the charging strategy envisages three different charging conditions in respective temperature intervals, according to which:
for temperatures comprised between $-Temp_1$ and $+Temp_1$, the supercapacitor group is kept fully charged, with $Temp_1$ being a first preset temperature value;
for temperatures comprised between $+Temp_1$ and $+Temp_2$, a voltage decreased between a first voltage value and a second voltage value, lower than the first voltage value, is applied to the backup supply voltage ($V_{sc}$), with $Temp_2$ being a second preset temperature value, higher than the first preset temperature value; and
for temperatures higher than $Temp_2$, the supercapacitor group is discharged up to a third voltage value, lower than the second voltage value.

11. The backup energy source according to claim 10, wherein the first preset temperature value ($Temp_1$) is in the range 38° C.-42° C., and the second preset temperature valve ($Temp_2$) is in the range 85° C.-90° C.

12. The backup energy source according to claim 1, wherein the diagnostic module is run by the control unit during operation of the automotive system.

13. The backup energy source according to claim 1, wherein the failure operating condition includes a failure of the main power source of the motor vehicle providing the main supply voltage ($V_{batt}$), or of an electrical connection between the main power source and the backup energy source.

14. The backup energy source according to claim 1, further including a boost module coupled to the supercapacitor group and configured to receive the backup supply voltage ($V_{sc}$) from the supercapacitor group and to increase the backup supply voltage ($V_{sc}$) prior to transmission to the automotive system.

15. A method for controlling a backup energy source for an automotive system in a motor vehicle, designed to receive a main supply voltage ($V_{batt}$), during a normal operating condition, and configured to provide a backup supply voltage ($V_{sc}$) during a failure operating condition, different from the normal operating condition, the method comprising: the step of controlling, by a control unit, recharging of a supercapacitor group, to store energy during the normal operating condition; the step of increasing the backup supply voltage ($V_{sc}$) with a boost module; the step of providing the increased backup supply voltage ($V_{sc}$) during the failure operating condition; the step of controlling including monitoring an operating status of the supercapacitor group during its operation by detecting at least a value of the backup supply voltage ($V_{sc}$); and the step of monitoring, during the recharging process, an equivalent series resistance (ESR) of the supercapacitor group to check if it is lower than a preset maximum valve, by measuring a voltage drop on the supercapacitor group, when charging is interrupted and a charging current ($I_{ch}$) is zeroed, based on said recharging process.

16. The method according to claim 15, wherein monitoring the operating status of the supercapacitor group includes determining one or more of the following failure modes of the supercapacitor group: an open circuit failure; a short circuit failure; and increase of a leakage current; an increase of an equivalent series resistance (ESR); a decrease of a value of capacitance (C).

17. The method according to claim 15, wherein monitoring the operating status of the supercapacitor group includes estimating a value of capacitance (C) of the supercapacitor group, by monitoring the time ($\Delta T$) to charge the supercapacitor group from a preset partially discharged value ($V_1$) to a preset fully charged value ($V_2$) for the backup supply voltage ($V_{sc}$).

18. The method according to claim 15, wherein monitoring the operating status of the supercapacitor group includes monitoring the operating temperature of the supercapacitor group; and the step of controlling charging of the supercapacitor group includes implementing a charging strategy, as a function of the monitoring operating temperature.

19. The method according to claim 18, wherein the step of implementing a charging strategy includes implementing one of the following three different charging conditions in respective temperature intervals, according to which:
 for temperatures comprised between $-\text{Temp}_1$ and $+\text{Temp}_1$, the supercapacitor group is kept fully charged, with $\text{Temp}_1$ being a first preset temperature value;
 for temperatures comprised between $+\text{Temp}_1$ and $+\text{Temp}_2$, a voltage value, lower than the first voltage value, is applied to the backup supply voltage ($V_{sc}$), with $\text{Temp}_2$ being a second preset temperature value, higher than the first preset temperature value; and
 for temperatures higher than $\text{Temp}_2$, the supercapacitor group is discharged up to a third voltage value, lower than the second voltage value.

20. A backup energy source for an automotive system in a motor vehicle, designed to receive a main supply voltage ($V_{batt}$) from a main power source of the motor vehicle, during a normal operating condition, and configured to provide a backup supply voltage ($V_{sc}$) during a failure operating condition of the main power source, different from the normal operating condition, the backup energy source comprising:
 a control unit;
 a supercapacitor group, controlled by the control unit to store energy during the normal operating condition and to provide the backup supply voltage ($V_{sc}$) during the failure operating condition of the main power source;
 a charge module, controllable by the control unit to recharge the supercapacitor group, starting from the main supply voltage ($V_{batt}$), whenever power from the main supply voltage ($V_{batt}$) is available; and
 a diagnostic module, coupled to the supercapacitor group and designed to provide the control unit with information concerning an operating status of the supercapacitor group,
 wherein the diagnostic module is configured to detect at least a value of the backup supply voltage ($V_{sc}$), and to monitor, during the recharging process, an equivalent series resistance (ESR) of the supercapacitor group and the operating temperature of the supercapacitor group and to cooperate with the charge module and/or the control unit to implement a charging strategy, as a function of the detected operating temperature, based on said recharging process.

\* \* \* \* \*